Oct. 14, 1969     R. H. COLLEY     3,472,029

GAS TURBINE POWER UNITS

Filed Feb. 12, 1968

Inventor
Rowan Herbert Colley
By Cushman, Darby & Cushman
Attorneys

United States Patent Office 3,472,029
Patented Oct. 14, 1969

3,472,029
GAS TURBINE POWER UNITS
Rowan H. Colley, Sunnyhill, Derby, England, assignor to Rolls-Royce Limited, Derby, England, a British company
Filed Feb. 12, 1968, Ser. No. 704,821
Claims priority, application Great Britain, Mar. 7, 1967, 10,563/67
Int. Cl. F02k 1/06; B64d 41/00
U.S. Cl. 60—271
3 Claims

ABSTRACT OF THE DISCLOSURE

A gas turbine engine positioned in an engine bay and an exhaust duct for said engine aligned with an outlet port in said bay, an exhaust duct obturating means resiliently attached to an engine bay door and means for moving said obturating means and said door for closing said exhaust duct and said outlet port.

---

This invention concerns gas turbine engines.

According to the present invention there is provided means for reducing fire hazard in a compartment wherein at least one gas turbine type engine is mounted, said means comprising power means for rotating the engine compressor and obturating means for obturating the engine exhaust gas duct outlet on cessation of said rotation.

The means may include an electric motor to rotate the compressor.

The electric motor may be the same one which is used to start the engine.

Alternatively, the means could include the use of a pneumatic motor to rotate the compressor.

Furthermore, the pneumatic motor could be the same one which is used to start the engine.

Preferably actuating means are provided which substantially simultaneously cut off the fuel supply and start up the electric or pneumatic motor.

If, after the electric or pneumatic motor has been switched off, the jet pipe or other hot part is still hot enough to ignite any fuel vapor which may be in the ambient air, means may be provided whereby the jet pipe nozzle outlet is obturated, to prevent the vapor from entering the jet pipe.

The obturating means may comprise a hinged cover or the like, adapted to selectively sealingly cover and uncover the nozzle outlet.

Preferably the obturating means is actuated by the power source which operates the starter motor.

Preferably, the manner of actuation is such that when the starter motor is switched on so as to rotate the compressor, the obturating means is removed from the nozzle outlet, and when said starter motor is switched off, the obturating means covers the nozzle outlet.

Preferably the exterior of the jet pipe is enclosed within thermal insulation material of any known kind.

Furthermore, the said material would preferably extend axially forwards to substantially cover the combustion equipment.

The method will now be described by way of example only and with reference to the accompanying drawings in which.

Figure 1:
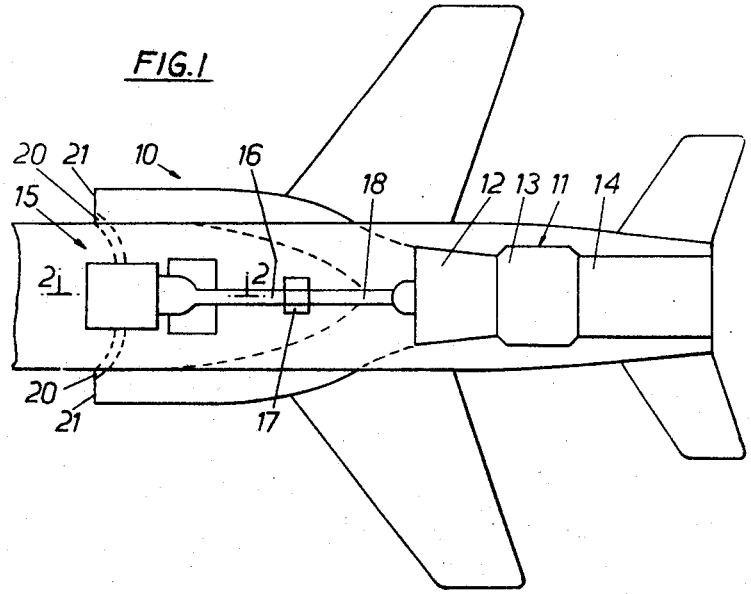
FIGURE 1 is a diagrammatic plan view of an aircraft employing the invention.

In FIGURE 1 an aircraft 10 is provided with an internally mounted main propulsion engine 11. Engine 11 is a gas turbine jet propulsion engine and one method of starting this type of engine is to provide means to initially rotate its compressor 12 end, therefore, its turbine 14, since the two are connected, and to supply fuel to the combustion chambers 13. The rotation of compressor 12 causes pressurized air to be forced into combustion chambers 13. This air is mixed with said fuel and the mixture is ignited. The resulting hot gas is expanded through turbine 14, thus providing further means whereby the turbine end compressor can be rotated and when the rate of expansion of hot gas through turbine 14 is sufficient to ensure self sustained rotation, then the means of initial rotation are disconnected.

In the present invention, the means for providing initial rotation comprises an auxiliary gas turbine engine, mounted internally of the aircraft, forward of main propulsion engine 10 and being indicated by the numeral 15. Auxiliary engine 15 is drivingly connected to engine 10 via shafting 16–18 and clutch mechanism 17. Air for the compressor 19 (FIGURE 2) is taken in through air intakes 20 situated within further air intakes 21 which supply the main engine 11.

An electric or pneumatic motor 22 or the like, is drivingly connected, via clutch mechanism 23 and shaft 16, to auxiliary engine 15. An accessary drive unit 24 also has motor 22 drivingly connected to it.

When main engine 11 is required to be started, starter motor 22 is first actuated by power supply means not shown.

Actuation of motor 22 rotates shaft 16, which in turn rotates compressor 19 and turbine 25 of auxiliary engine 15. When the rotation of compressor 19 is sufficiently rapid to ensure that the required delivery of air to the combustion chamber 26 is attained then fuel is introduced to the combustion chambers 26 via injectors 27 and the air/fuel mixture is ignited. The hot gases which are so produced, are expanded through turbine 25, into jet pipe 28 and so to atmosphere via outlet nozzle 29 and closeable aperture 30 in the fuselage of aircraft 10.

In normal circumstances, when an auxiliary engine is required to be used, it is because the aircraft, having been fully fueled, is going to take-off and of course needs thrust from the main engine, which needs assistance from the auxiliary engine in order to start. Herein lies the fire hazard.

When a large amount of fuel is transferred from one place to another by pressure hoses or the like, as happens when an aircraft is being fueled, fuel vapor escapes and remains in the atmosphere in the vicinity of the transfer operation for some considerable time. Furthermore, neat fuel sometimes leaks into the space wherein the engine is mounted and is vaporised by heat radiated from the engine.

The vapor causes no undue fire hazard while the auxiliary engine is running, since the hot gas issuing at high velocity from nozzle outlet 29, will entrain some surrounding air and discourages ignition. This situation applies where any turbine engine, whether auxiliary or main, is running in an enclosed space.

However, when the auxiliary engine is shut down, the jet pipe 28 both inside and outside, remains extremely hot for several mintues, and as there is now no efflux of gas to entrain air, vapor could rise into and onto the jet pipe and become ignited.

Thermal insulation 31 placed around those external parts of the engine which get very hot, will prevent vapor from being ignited by the external parts of the engine. The insulation could comprise any known type which is suitable for such application.

In order to prevent vapor from being ignited by the heated inner surface of jet pipe 28 after auxiliary engine 15 has been shut down, starter motor 22 is actuated so as to cause compressor 19 to continue rotating. However, the auxiliary engine fuel system is not actuated, thus a flow of relatively cold air is set up through the combustion chambers 26 and jet pipe 28, ensuring a rapid drop in temperature.

As starter motors can be run for only a short time without sustaining damage, it may be necessary to switch off the motor 22 before the jet pipe 28 has cooled sufficiently. Therefore, a further provision is made in the form of a jet pipe obturating member 32. Member 32 comprises a metal plate 33 hinged at 34 to the inner wall of fuselage 10. A second plate 35 is resiliently attached to plate 33, by springs 36.

Figure 2:
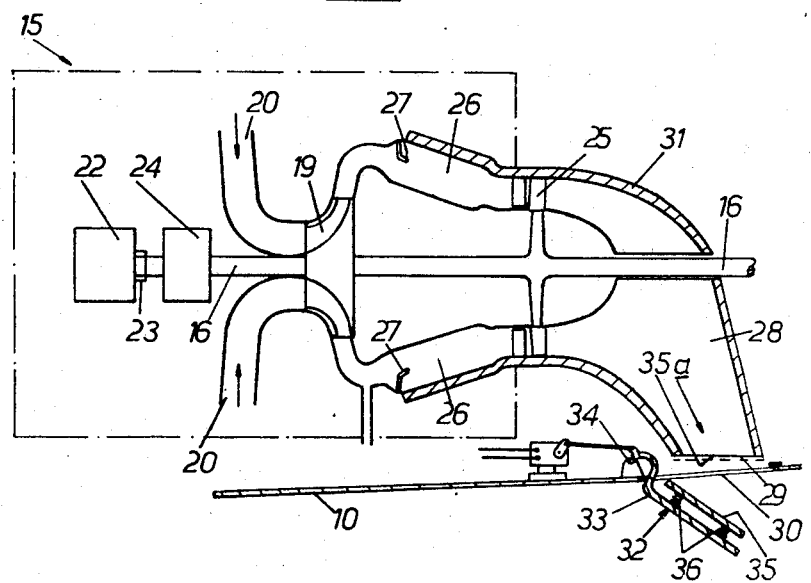
FIGURE 2 is an enlarged axial part section on line 2—2 of FIGURE 1.

Actuation of member 32 is by means indicated diagrammatically at 38 and which may be any known lever actuation system and which may be connected to the power supply of motor 22, the connection being such that when motor 22 is switched on, member 32 is pivoted away from jet pipe nozzle 29 to the position shown in FIGURE 2 and when motor 22 is switched off, member 32 is pivoted to a position as indicated by chain dotted line 35a, thus causing plate 33 to close aperture 30 in the aircraft fuselage and causing springs 36 to urge plate 35 into sealing contact with the nozzle 29, thereby preventing fuel vapor from entering jet pipe 28.

I claim:
1. In combination with a gas turbine engine mounted within an engine bay, the wall structure of said bay having a door mounted therein, for the passage therethrough, when open, of exhaust gases from the engine, engine exhaust duct outlet obturating means and resilient means adapted to urge said obturating means against said outlet when said door is shut.

2. A combination as claimed in claim 1 wherein said resilient means are attached to the obturating means and door so as to space them such that when said door is shut, said obturating member contacts and covers said outlet and said resilient means are compressed.

3. A combination as claimed in claim 1 wherein said obturating means comprises a flat plate.

References Cited

UNITED STATES PATENTS

| 2,652,685 | 9/1953 | Willgoos | 60—39.09 XR |
| 3,203,651 | 8/1965 | Garrett | 60—39.09 XR |
| 3,327,482 | 6/1967 | Pike | 60—271 |
| 3,386,688 | 6/1968 | Clejan | 244—58 XR |

CARLTON R. CROYLE, Primary Examiner

U.S. Cl. X.R.

60—39.09, 39.14; 239—506, 507; 244—58; 431—3